(12) United States Patent
Basu et al.

(10) Patent No.: US 12,093,676 B2
(45) Date of Patent: Sep. 17, 2024

(54) INTELLIGENT MANAGEMENT OF SOFTWARE DEPLOYMENT BASED ON CODE CHANGE

(71) Applicant: Dell Products L.P., Round Rock, TX (US)

(72) Inventors: Rangan Basu, Gurugram (IN); Rohit Gosain, Bangalore (IN); Shibi Panikkar, Bangalore (IN); Anup Kumar, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 17/575,765

(22) Filed: Jan. 14, 2022

(65) Prior Publication Data
US 2023/0229413 A1 Jul. 20, 2023

(51) Int. Cl.
*G06F 9/44* (2018.01)
*G06F 8/65* (2018.01)
(Continued)

(52) U.S. Cl.
CPC ............. *G06F 8/65* (2013.01); *G06F 21/577* (2013.01); *G06N 5/022* (2013.01); *G06F 2221/033* (2013.01)

(58) Field of Classification Search
CPC .................................................. G06F 8/65
(Continued)

(56) References Cited

U.S. PATENT DOCUMENTS 8,341,270 B2 * 12/2012 Mazzaferri ........... G06F 21/629
 718/1
9,843,533 B2 * 12/2017 Turovsky ................ H04L 47/76
(Continued)

FOREIGN PATENT DOCUMENTS

| CN | 112685738 A | * | 4/2021 |
| CN | 114003250 A | * | 2/2022 |
| KR | 20220060843 A | * | 5/2022 |

OTHER PUBLICATIONS

GitLab, "Simply Your Workflow with GItLab: Develop with DevOps in a Single Application," https://about.gitlab.com/stages-devops-lifecycle/, Accessed Jan. 12, 2022, 6 pages.
(Continued)

*Primary Examiner* — Evral E Bodden
(74) *Attorney, Agent, or Firm* — Ryan, Mason & Lewis LLP

(57) ABSTRACT

Automated management of software code change and deployment in an information processing system is disclosed. In one example, a method comprises the following steps. The method obtains one or more parameters specifying a software deployment following at least one code change to a set of one or more software programs. The method distinguishes first portions of the set of one or more software programs that are affected by the at least one code change from second portions of the set of one or more software programs that are unaffected by the at least one code change. The method generates at least one deployment script for causing deployment of the first portions of the set of one or more software programs without causing deployment of the second portions of the set of one or more software programs.

20 Claims, 17 Drawing Sheets

(51) Int. Cl.
*G06F 21/57* (2013.01)
*G06N 5/022* (2023.01)
(58) Field of Classification Search
USPC .......................................................... 717/168
See application file for complete search history.

(56) References Cited

U.S. PATENT DOCUMENTS

| | | | | |
|---|---|---|---|---|
| 10,007,511 | B2* | 6/2018 | Somani | G06F 8/71 |
| 10,148,677 | B2* | 12/2018 | Muddu | G06F 3/0482 |
| 10,803,392 | B1* | 10/2020 | Khan | H04L 67/10 |
| 10,908,837 | B2* | 2/2021 | Fetik | G06F 3/0653 |
| 2014/0380280 | A1* | 12/2014 | Millwood | G06F 11/366 |
| | | | | 717/127 |
| 2023/0124621 | A1* | 4/2023 | Umesh | G06F 21/577 |
| | | | | 726/23 |

OTHER PUBLICATIONS

Wikipedia, "DevOps," https://en.wikipedia.org/w/index.php?title=DevOps&oldid=1060497539, Dec. 15, 2021, 9 pages.

Wikipedia, "CI/CD," https://en.wikipedia.org/w/index.php?title=CI/CD&oldid=1062446811, Dec. 28, 2021, 2 pages.

Wikipedia, "Continuous Delivery," https://en.wikipedia.org/w/index.php?title=Continuous_delivery&oldid=1054685039, Nov. 11, 2021, 6 pages.

Wikipedia, "Continuous Deployment," https://en.wikipedia.org/w/index.php?title=Continuous_deployment&oldid=1050036713, Oct. 15, 2021, 2 pages.

Wikipedia, "Continuous Integration," https://en.wikipedia.org/w/index.php?title=Continuous_integration&oldid=1063426859, Jan. 3, 2022, 9 pages.

\* cited by examiner

```
dsc-rbac-audit > single-source.json

Project ▼

∨ dsc-rbac-audit [dsc-rbac-events] C:\Users\rangan_basu\Docum
  > .idea
  ∨ applications
    > eventconsumerapp
    > userprofileapp
      applications.iml  6/30/2021 1:37PM, 11.83 kB
      pom.xml  6/30/2021 1:33PM, 675 B
  ∨ components
    > configuration
    > usermodel
    > userprofileconsumer
    > usertransactionconsumer
      components.iml  6/30/2021 1:37 PM, 11.83 kB
      pom.xml  6/30/2021 1:33PM, 761 B
  .gitignore  6/30/2021 1:33 PM, 395 B
  .gitlab-ci.yml  7/2/2021 4:49 PM, 20.04 kB
  dsc-rbac-events.iml  6/30/2021 1:37 PM, 11.83 kB
  pom.xml  7/5/2021 5:48 PM, 3.8 kB
  README.md  6/30/2021 1:33 PM, 80 B
  single-source.json  7/5/2021 4:12 PM, 2.59 kB
  External Libraries
  Scratches and Consoles
```

```
consumerapp) ×  pom.xml (usertransactionconsumer) ×
 1  {
 2    "dev": {
 3      "applications": {
 4        "eventconsumerapp": {
 5          "blue-manifest" : "manifest-dev.yml",
 6          "green-manifest": "manifest-green-dev.yml",
 7          "blue-name" : "rbaceventsconsumer",
 8          "green-name": "rbaceventsconsumer-temp",
 9          "serviceregistryname" : "rbac-service-registry",
10          "serviceregistryenabled" : true,
11          "blue-green_excluded" : true
12        },
13        "userprofileapp": {
14          "blue-manifest" : "manifest-dev.yml",
15          "green-manifest": "manifest-green-dev.yml",
16          "blue-name" : "userprofileapp",
17          "green-name": "userprofileapp-temp",
18          "serviceregistryname" : "rbac-service-registry",
19          "serviceregistryenabled" : false,
20          "blue-green-excluded" : false
21        }
22      },
23      "domain" : "cfd.isus.emc.com",
24      "blue-green" : true,
25      "deploy-all" : true
26    },
27    "sit": {"domain" : "cft.isus.emc.com" ... },
28    "s1" : {"domain" : "s1.pcf.dell.com" ... }
29  }
```

```xml
<build>
    <plugins>
        <plugin...>
        <plugin...>
        <plugin>
            <groupId>com.dell.it.dsc.plugin</groupId>
            <artifactId>dsc-maven-plugin</artifactId>
            <version>0.0.7-SNAPSHOT</version>
            <executions>
                <execution>
                    <goals>
                        <goal>dsc</goal>
                    </goals>
                </execution>
            </executions>
            <configuration>
                <respository>.git</respository>
                <file>single-source.json</file>
                <environment>${env}</environment>
            </configuration>
        </plugin>
    </plugins>
</build>
:/project>
```

FIG. 5
500

- Fetch all the project components and project applications

- Fetch the list of projects under components folder – call it projectComponents

- for each changedProject in changedProjects, Scan through the projectComponents if changedProject in ProjectComponents,
        then include it as an impacted project

- for each impactedProject in impactedProjects
    a. if impactedProject is child of applications folder, add the impactedProject under deployables.
    b. if impactedProject is child of data folder, add the impactedProject under deployables.
    c. for each application in applications list, find if application is having dependency of impactedProject.
        if Yes, add application under deployables

FIG. 6A
600

```
cf push -f applications/userprofileapp/manifestgreen-sit.yml
-p $TARGET/userprofileapp-0.0.1-SNAPSHOT.jar
```

FIG. 6B
610

```
cf map-route userprofileapp-temp cfd.isus.emc.com --hostname userprofileapp
cf unmap-route userprofileapp cfd.isus.emc.com --hostname userprofileapp
cf delete userprofileapp -f
cf rename userprofileapp-temp userprofileapp
cf delete-route cfd.isus.emc.com --hostname userprofileapp-temp
```

FIG. 7
700

```
#build and publish to artifacts/target
build_and_publish:
  stage: build
  before_script:
    - echo "Starting the Maven compile build"
  script:
#    - 'mvn $MAVEN_CLI_OPTS clean install -DskipTests=true'
    - 'mvn $MAVEN_CLI_OPTS clean test-compile install package -DskipTests=true -Denvironment=dev,dit,sit,perf,p1,s1,prod'
  after_script:
    - echo "Completed the Maven compile"
    - find $ci_PROJECT_DIR -name target
    - 'mkdir $CI_PROJECT_DIR/target/'
    - cp -f $CI_PROJECT_DIR/applications/eventconsumerapp/target/*.jar $TARGET
    - cp -f $CI_PROJECT_DIR/applications/userprofileapp/target/*.jar $TARGET
    - if [ -e $CI_PROJECT_DIR/deploycontent-dev.sh ]; then cp -f $CI_PROJECT_DIR/deploycontent-dev.sh $TARGET; fi
    - if [ -e $CI_PROJECT_DIR/deploycontent-sit.sh ]; then cp -f $CI_PROJECT_DIR/deploycontent-sit.sh $TARGET; fi
    - if [ -e $CI_PROJECT_DIR/deploycontent-s1.sh ]; then cp -f $CI_PROJECT_DIR/deploycontent-s1.sh $TARGET ; fi
    - if [ -e $CI_PROJECT_DIR/deployContentGreen-dev.sh ]; then cp -f $CI_PROJECT_DIR/deployContentGreen-dev.sh $TARGET; fi
    - if [ -e $CI_PROJECT_DIR/deployContentGreen-sit.sh ]; then cp -f $CI_PROJECT_DIR/deployContentGreen-sit.sh $TARGET ; fi
    - if [ -e $CI_PROJECT_DIR/deployContentGreen-s1.sh ]; then cp -f $CI_PROJECT_DIR/deployContentGreen-s1.sh $TARGET ; fi
    - if [ -e $CI_PROJECT_DIR/golive-sit.sh ]; then cp -f $CI_PROJECT_DIR/golive-sit.sh $TARGET ; fi
    - if [ -e $CI_PROJECT_DIR/golive-dev.sh ]; then cp -f $CI_PROJECT_DIR/golive-dev.sh $TARGET ; fi
    - if [ -e $CI_PROJECT_DIR/golive-s1.sh ]; then cp -f $CI_PROJECT_DIR/golive-s1.sh $TARGET ; fi
```

```
artifacts:
  paths:
    - $TARGET
    - $CI_PROJECT_DIR/applications/*/target/*.jar
allow_failure: false
only:
  - development
  - dev-integration
  - integration
  - release
  - blue-green-di
tags:
  - linux
```

```
#S1-PROD
Pcf_S1_Deploy:
  stage: deploy-drprod
  image: $CF-IMAGE
  dependencies:
    - build_and_publish
    - unit_testing
  before_script:
    - cf login -a $PCF_URL_S1 -u $PCF_USERNAME -p $PCF_PASSWORD -o $PCF_ORG_NAME_S1 -s $SPACE_S1
    - cd $TARGET
    - if [ -e $TARGET/deploycontent-s1.sh ]; then cp -f $TARGET/deploycontent-s1.sh $CL_PROJECT_DIR ; fi
    - if [ -e $TARGET/deployContentGreen-s1.sh ]; then cp -f $TARGET/deployContentGreen-s1.sh $CL_PROJECT_DIR ; fi
    - cd $CL_PROJECT_DIR
    - if [ -e deploycontent-s1.sh ]; then chmod +x deploycontent-s1.sh; fi
    - if [ -e deployContentGreen-s1.sh ]; then chmond +x deployContentGreen-s1.sh; fi
```

```
script:
  - if [ "$DEPLOY" == "ALL" ];
    then cf push -f applications/eventconsumerapp/manifest-s1.yml -b $JAVA_BUILDPACK;
    cf push -f applicaitons/userprofileapp/manifest-s1.yml -b $JAVA_BUILDPACK
  - if [[ -e deploycontent-s1.sh && "$DEPLOY" != "ALL" ]]; then ./deploycontent-s1.sh; fi
  - if [[ -e deployContentGreen-s1.sh && "$DEPLOY" != "ALL" ]]; then ./deployContentGreen-s1.sh; fi
after_script:
  -cf logout
  -rm -f $TARGET/deploycontent-s1.sh
artifacts:
  expire_in: 1 week
  paths:
    - log-output.txt
when: manual
only:
  - blue-green-di
tags:
  - linux
```

```
switch-route-s1:
  when: manual
  allow_failure: false
  stage: go-live
  dependencies:
    - build_and_publish
  image: $CF_IMAGE
  before_script:
    - cf login -a $PCF_URL_S1 -u $PCF_USERNAME -p $PCF_PASSWORD -o
      $PCF_ORG_NAME-S1 -s $SPACE_S1
    - cd $TARGET
    - if [ -e goLive-s1.sh ]; then chmod +x goLive-s1.sh; fi
    - if [ -e $TARGET/goLive-s1.sh ]; then cp -f $TARGET/goLive-s1.sh $CI_PROJECT_DIR; fi
    - cd $CI_PROJECT_DIR
  script:
    - if [ -e goLive-s1.sh ]; then ./goLive-s1.sh; fi
    # Test to make sure there were not critical/error exceptions thrown
    #- if [[ $(cat Log-route-change.text | grep -o 'crit\|fail' | wc -l) -gt 0 ]];
        then echo "'!!!! Too many critical/error exceptions found to proceed to production",
    # If JMeter produced a failed file then fail the job step
    - if [ -f "failed" ]; then exit 1; fi
    -cf logout
  artifacts:
    when: always
    expire_in: 1 week
    paths:
      - log-route-change.text
  only:
    - blue-green-di
  tags:
    - linux
```

```
#stage: Checkmarx
Checkmarx-API:
  image: harbor.dell.com/docker-store/security-devops : 18-v1.3.9
  stage: static-analysis
  variables:
    CX_PROJECT_NAME_API: '$CHECKMX_APPLICATION/$CHECKMX_TEAMNAME/RCA-API'
    CX_PROJECT_PATH_API: '$CI_PROJECT_DIR/Rca-API/src'
  when: on_success
  script:
    - sastctl checkmarx --token=$CHECKMX_TOKEN $CX_PROJECT_NAME_API $CX_PROJECT_PATH_API $CX_COMMENT
  allow_failure: false
  before_script:
    - echo "Starting the Checkmarx Scan"
  except:
    - tags
  only:
    - master
    - development
    - integration2
    - release2
  tags:
    - linux
```

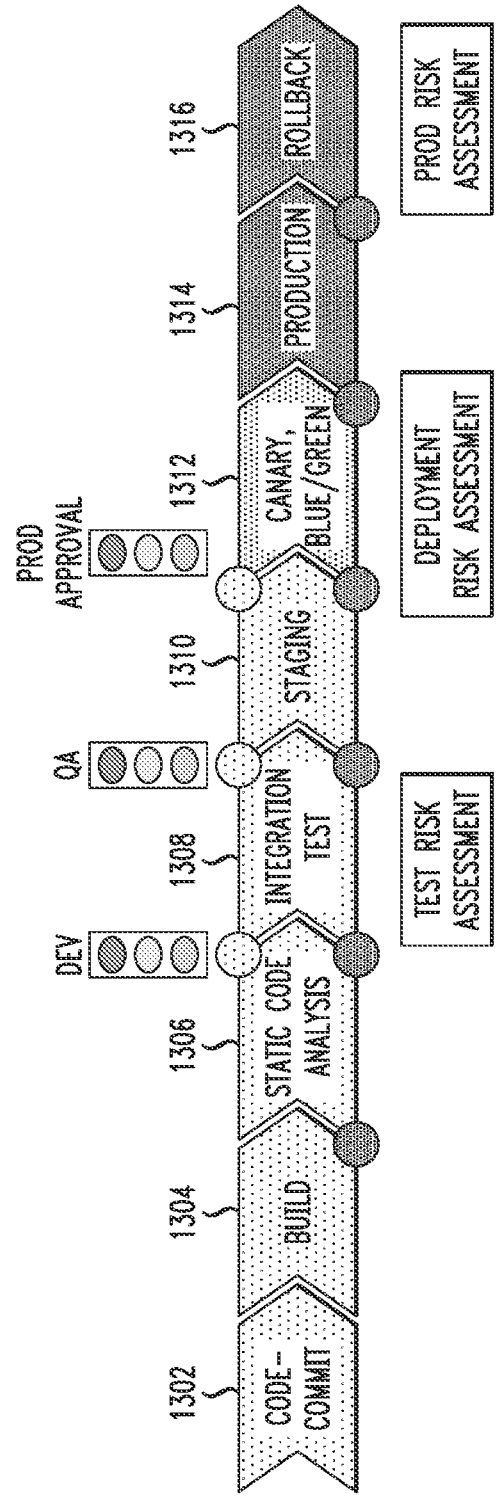

```
{
  "project": "Demo_App",
  "account": "DSC_EPS",
  "errors": [
    {
      "type": "Client_DOM_Open_Redirect",
      "severity": "low",
      "state": "recurrent",
      "ignore": true
    },
    {
      "type": "Client_Remote_File_Inclusion",
      "severity": "low",
      "state": "recurrent",
      "ignore": true
    },
    {
      "type": "Client_Potential_XSS",
      "severity": "high",
      "state": "recurrent",
      "ignore": false
    }
  ]
}
```

1600

INTELLIGENT MANAGEMENT OF SOFTWARE DEPLOYMENT BASED ON CODE CHANGE

FIELD

The field relates generally to information processing systems, and more particularly to software management in such information processing systems.

DESCRIPTION

Software development presents technical problems for many organizations. The process of writing deployment scripts with requirements tailored to each specific deployment environment (e.g., computing environment where a set of software programs is to be loaded and executed) takes a significant amount of time and, hence, impacts the developer's efficiency and deliverables. To add to this technical problem with conventional software management, when there is a code change in a subset of the set of software programs, a deployment script for the entire set of software programs has to be generated.

SUMMARY

Illustrative embodiments provide automated management of software code change and deployment in an information processing system.

For example, in one illustrative embodiment, a method comprises the following steps. The method obtains one or more parameters specifying a software deployment following at least one code change to a set of one or more software programs. The method distinguishes first portions of the set of one or more software programs that are affected by the at least one code change from second portions of the set of one or more software programs that are unaffected by the at least one code change. The method generates at least one deployment script for causing deployment of the first portions of the set of one or more software programs without causing deployment of the second portions of the set of one or more software programs.

In one or more additional illustrative embodiments, the method may cause performance of a code scanning process for processing the first portions of the set of one or more software programs to detect any vulnerabilities therein.

In one or more further illustrative embodiments, the method may utilize a machine learning model to decide whether a result of the code scanning process is submitted for approval by an approver or is automatically approved.

These and other illustrative embodiments include, without limitation, apparatus, systems, methods and computer program products comprising processor-readable storage media.

BRIEF DESCRIPTION OF THE DRAWINGS

FIG. 3 illustrates a configuration file according to an illustrative embodiment.

FIG. 4 illustrates plugin code for a software deployment management engine according to an illustrative embodiment.

FIG. 5 illustrates deployment script generation according to an illustrative embodiment.

FIGS. 6A and 6B illustrate sample content associated with a blue-green deployment according to an illustrative embodiment.

FIG. 7 illustrates an example of a build stage with generation of deployment scripts according to an illustrative embodiment.

FIG. 8 illustrates an example of a deployment stage invoking deployment scripts according to an illustrative embodiment.

FIG. 9 illustrates an example of a go-live stage invoking deployment scripts according to an illustrative embodiment.

FIG. 12 illustrates an example of typical static application security test scanning methods.

FIG. 13 illustrates an application lifecycle and corresponding risk assessments associated with various lifecycle stages according to an illustrative embodiment.

FIG. 15 illustrates sample data from static application security test scanning according to an illustrative embodiment.

DETAILED DESCRIPTION

Figure 1:
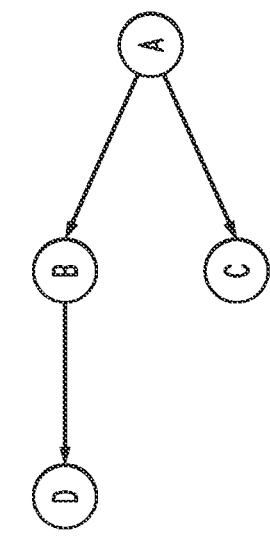
FIG. 1 illustrates a dependency graph according to an illustrative embodiment.

It is realized herein that, currently, there is no process of identifying which software programs in a set of software programs are affected by a code change, which means developers need to configure continuous integration and continuous delivery (CI/CD) pipelines in such a manner that all software programs need to get deployed irrespective of the fact that the code changes may not affect certain software programs altogether. A CI/CD pipeline is a series of steps that are performed in order to deliver a new version of software. This leads to longer and unoptimized CI/CD pipeline run times and occupies GitLab resources, such as runners for longer than required. GitLab is an open-source DevOps tool that combines the ability to develop, secure, and operate software in a single platform.

More particularly, in current approaches, once the code is checked into a version control system of the DevOps tool (e.g., GitLab), pipelines must be written in such a manner that all software programs in a project get deployed, irrespective of new code changes affecting the software program(s) or not. This is not only wasteful but also increases the time to deploy and thereby reduces the time to ship code. Moreover, in the code analytics stages, the entire code gets submitted for scans, thereby increasing the pipeline time. Often, approvers are presented all these software programs with errors and warnings. The approver must then find all the relevant portions of the set of software programs (e.g., applications/files/components) and make a decision for approval. Perhaps though, the approvers already approved the errors and warning in a previous build based on some use cases. These so-called static application security testing (SAST) stages take up a significant amount of time increasing the mean time to deploy.

Illustrative embodiments overcome the above and other drawbacks associated with software deployment management by providing an intelligent technical solution which identifies code changes in software continuum architectures and identifies which software programs are affected by the code change. The technical solution, in one or more illustrative embodiments, is a software deployment management engine in the form of a software plugin module which can be embedded into any software program following the continuum model. Based on the choice of environments, and changed files, illustrative embodiments give users the ability to generate custom deploy scripts intelligently, with the option to configure specifications such as environment level and software program level blue-green deployments. Blue-green deployment is a software release model that gradually transfers user traffic from a previous software version to a new software version, wherein both versions run in a production environment at the same time.

It is to be appreciated that the terms application or microservice may be used interchangeably herein with the term software program. Also, a given set of one or more application or microservices may be composed of one or more applications or microservices, as well as one or more software files and/or one or more software components or submodules. In some examples, files are parts of components or submodules, and components/submodules are parts of applications. However, it is to be appreciated that functional names given to different portions of software that comprise a set of one or more software programs are not intended to be limiting to embodiments described herein.

By way of example, it is further realized herein that in a GitLab environment, every project has a git folder where commit data is tracked. Thus, in accordance with one or more illustrative embodiments, on each commit, the software deployment management engine identifies the files affected by a code change by comparing the latest commit to the previous commit. Once the software deployment management engine identifies the files which have changes, the software deployment management engine identifies which components/submodules or applications these files belong to. Thus, this produces the following two scenarios:
  (i) File affected, belongs to a component declared as a dependency to a deployable application: In this case, the software deployment management engine finds the applications to which the component is declared as a dependency and identifies the application to deploy.
  (ii) File affected, belongs to application itself: In this case, the software deployment management engine deploys the application.

FIG. 1 illustrates the above two scenarios in a dependency graph 100. As shown, an application "A" is depicted having one file 'C' and a component "B" as dependencies. Component "B" in turn has file 'D' belonging to it. Commit on changes to file "D" depicts scenario (i) whereas changes to file "C" depicts scenario (ii) as described above. Note that, as mentioned above, files, components and applications are simply functional names given to different pieces of software code in given set of one or more software programs that is being deployed in a computing environment for execution.

Once the software deployment management engine identifies the affected changes in the application, the software deployment management engine generates a script for deploying only those applications, considering the target deployment environment.

In one or more illustrative embodiments, the software deployment management engine uses machine learning (ML) to confirm only required changes are being made during deployment, and considers vulnerability scan results to reduce the CD process. For example, if similar types of issues are approved by the same approver, CI will intelligently opt for auto approval.

Figure 2:
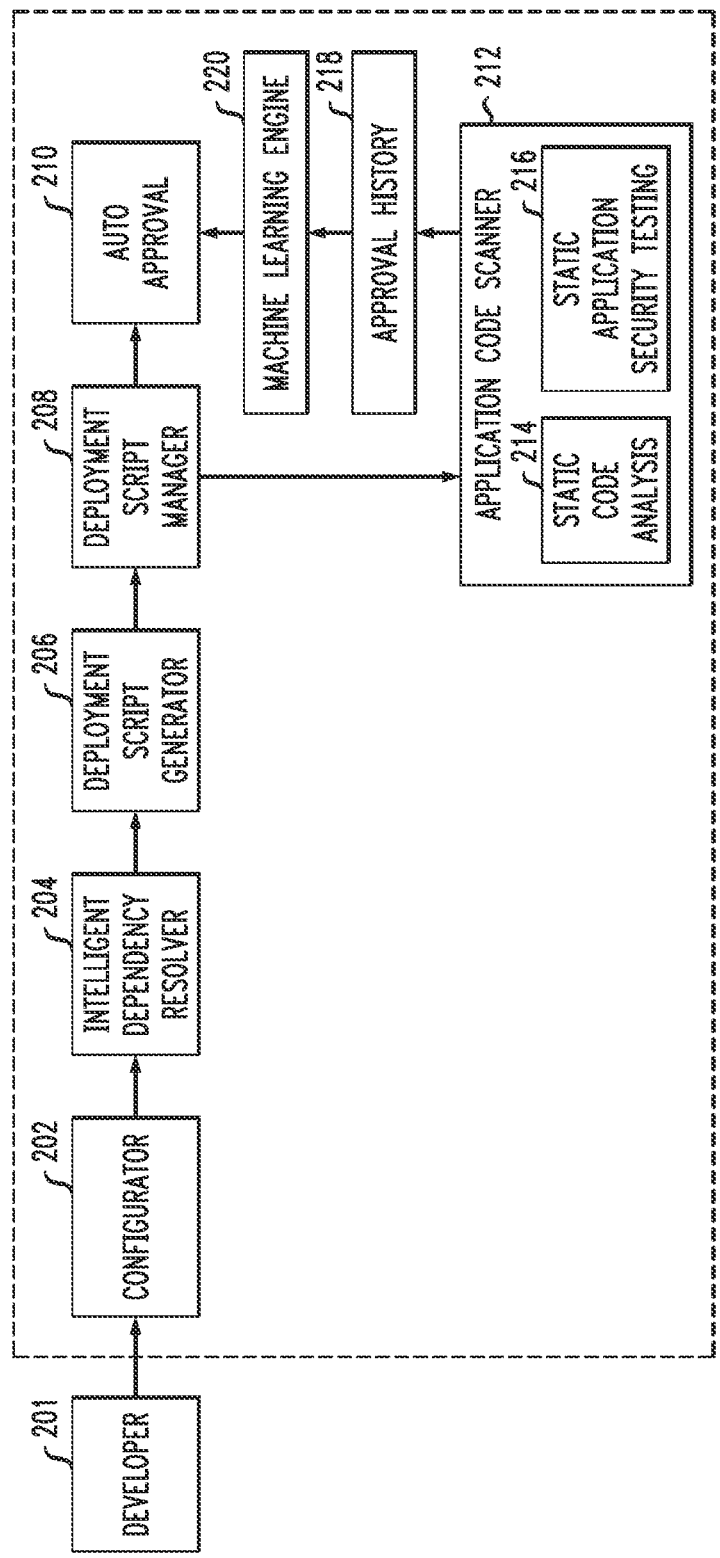
FIG. 2 illustrates a software deployment management engine according to an illustrative embodiment.

FIG. 2 illustrates a software deployment management engine 200 according to an illustrative embodiment. In one or more illustrative embodiments, software deployment management engine 200 is in the form of a software plugin module, as described above, that can be embedded in any software program and integrated with a DevOps platform such as, but not limited to, GitLab. It is to be understood that while a GitLab implementation is described in some illustrative embodiments herein, other embodiments may be implemented in other software deployment platforms and computing environments.

As shown, software deployment management engine 200 accepts input from a developer 201 including, but not limited to, parameters specifying, for a given set of one or more applications, a target deployment and a type of deployment. Note that developer 201, in one example, may represent a computing device of a software developer or other person tasked with assisting in managing deployment of one or more applications. Further, software deployment management engine 200 comprises a configurator 202, an intelligent dependency resolver 204, a deployment script generator 206, a deployment script manager 208, an auto-approval module 210, an application code scanner 212 itself comprising a static code analysis module 214 and a static application security testing (SAST) module 216, an approval history module 218, and a machine learning engine 220.

As will be further illustrated below in the context of a project example, configurator 202 receives the above-described input from developer 201 and generates one or more configuration files. Intelligent dependency resolver 204 finds all dependencies associated with files, components and applications within the set of one or more applications being considered for deployment (including redeployment) following a code change. For example, given a set of one or more applications, intelligent dependency resolver 204 determines dependency relationships associated with a code change as illustrated in dependency graph 100 of FIG. 1.

Deployment script generator 206 then generates deployment scripts (e.g., one for each deployment environment) for the one or more applications identified by intelligent dependency resolver 204. Deployment script manager 208 receives the deployment scripts from deployment script generator 206 and coordinates the generated scripts. The software code that is part of the generated scripts is passed to application code scanner 212 wherein vulnerability scans and/or other analysis is performed via static code analysis module 214 and/or SAST module 216. Approval history module 218 identifies whether any errors or warnings in the vulnerability scan or other analysis had previously been approved by an approver. This information is passed to machine learning engine 220 which decides whether any errors or warnings are new and need to be approved by an approver, or whether they are not new and therefore can be auto-approved by auto-approval module 210 such that the generated deployment scripts can be deployed. Further illustrative implementation details of software deployment management engine 200 will now be described.

On any code check into Gitlab, software deployment management engine 200 identifies the files affected by the subject code change by comparing the latest commit to the previous commit. Once software deployment management engine 200 identifies the files which have changes, it identifies which components or applications these files belong to and generates the deployment scripts based on the specifications given. By way of example only, developer 201 can specify the following configurations with regard to the deployment of applications: (i) which environment/environments to deploy the application in; (ii) whether to deploy applications via blue-green deployment at an environment level; (iii) whether to exclude individual applications from blue-green deployment based on the environment; (iv) whether to opt for blue-green deployment while binding to a common service registry; and/or (v) whether to override deployment intelligence provided by software deployment management engine 200 and deploy all applications based on the environment, e.g., deploy all applications in the development (dev) stage but deploy only applications affected by code changes in the system integration (sit) stage. FIG. 3 illustrates a configuration file 300 generated by configurator 202 for a sample project.

Based on the configurations file (e.g., configuration file 300) and inputs specified, deployment script generator 206 generates deployment scripts, each one tailored to each deployment environment. FIGS. 4-11 depict non-limiting examples of development script generation.

FIG. 4 illustrates plugin module code 400 used to implement functionalities of software deployment management engine 200. This non-limiting example relates to a dsc-rbac-audit project on an app-continuum architecture. Once the build stage is complete, deployment becomes a straightforward matter of calling the respective scripts in the correct deploy stage(s) of the pipeline. The build stage can accept inputs specifying for which environment to generate deployment scripts. FIG. 5 illustrates one example 500 for how deployment script generator 206 generates a deployment script. FIG. 6A illustrates sample content 600 of a blue-green deployment, while FIG. 6B illustrates sample content 610 of blue-green go-live functionalities.

More particularly, FIG. 7 depicts an example 700 of a build stage with generation of deployment scripts. The generated deployment scripts can then be invoked in the respective deploy stages of the pipeline. FIG. 8 depicts an example 800 of a deploy stage invoking deployment scripts. FIG. 9 depicts an example 900 of a go-live stage invoking deployment scripts.

Figure 10:
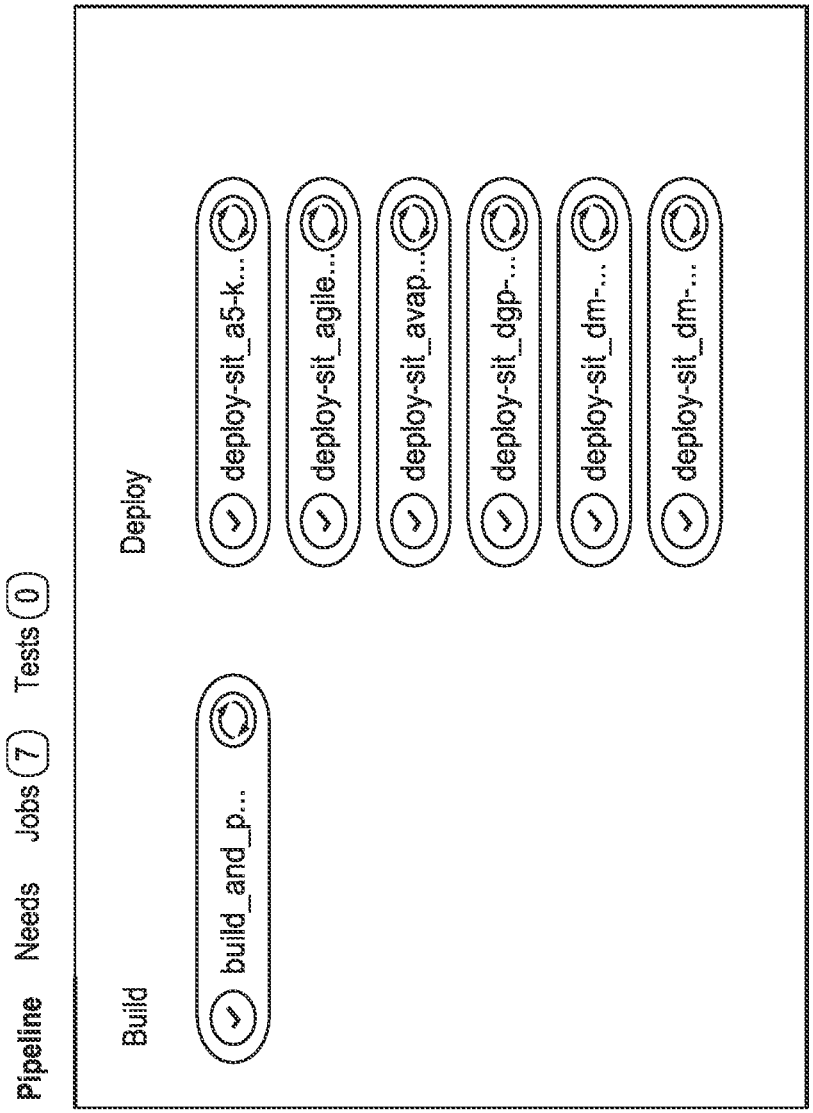
FIG. 10 illustrates a typical user interface associated with application deployment management.
Figure 11:
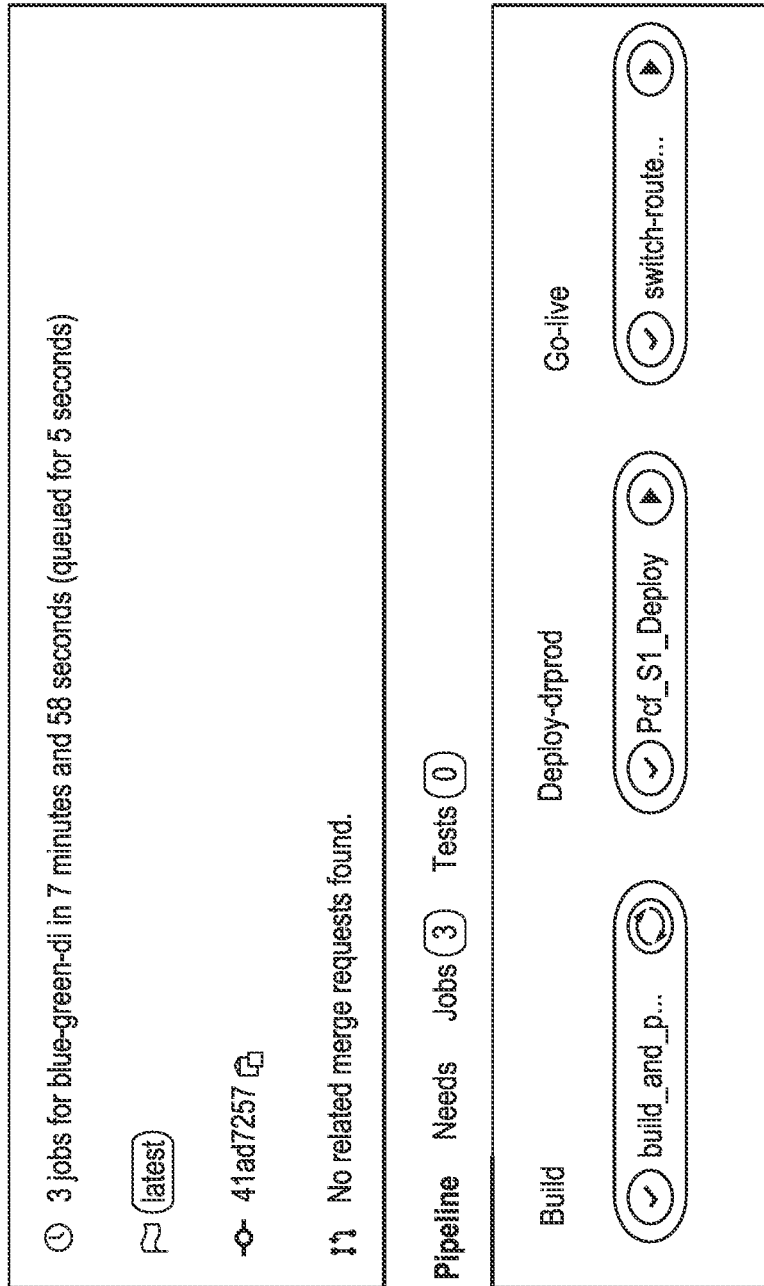
FIG. 11 illustrates a user interface associated with application deployment management according to an illustrative embodiment.

FIG. 10 shows a user interface 1000 associated with conventional application deployment management where all applications (regardless of whether or not they have been affected by a code change) are deployed. Advantageously, in comparison, FIG. 11 shows a user interface 1100 associated with application deployment management according to software deployment management engine 200 of a sample pipeline in action, after the integration stage optimally deploying only applications affected by the code changes.

As mentioned above, software deployment management engine 200 dynamically generates deployment scripts which only submit changed application codes for SAST scans in SAST module 216. FIG. 12 depicts an example 1200 of conventional SAST scanning methods whereby the entire project path is submitted for SAST scanning.

Software deployment management engine 200, on the other hand, generates deployment scripts which only submit changed application code for SAST scanning thereby reducing the mean time taken for the pipeline to execute. As mentioned above, errors and warnings flagged by in SAST scans require approvals to avoid them being ignored or missed thus enabling pipeline failures to occur. Advantageously, software deployment management engine 200 determines whether to pass a stage or fail it depending on the errors flagged off in this stage.

FIG. 13 illustrates an application lifecycle 1300 and corresponding risk assessments associated with various lifecycle stages. More particularly, application lifecycle 1300 comprises a code-commit stage 1302, a build stage 1304, a static code analysis stage 1306, an integration stage 1308, staging 1310, a gradual release stage 1312 (e.g., blue-green), a production stage 1314, and a rollback stage 1316. Risk assessments (test, deployment, and production, as shown) are leveraged using machine learning engine 220 to handle errors/warnings and auto-approval in the approval process, as explained above.

Figure 14:
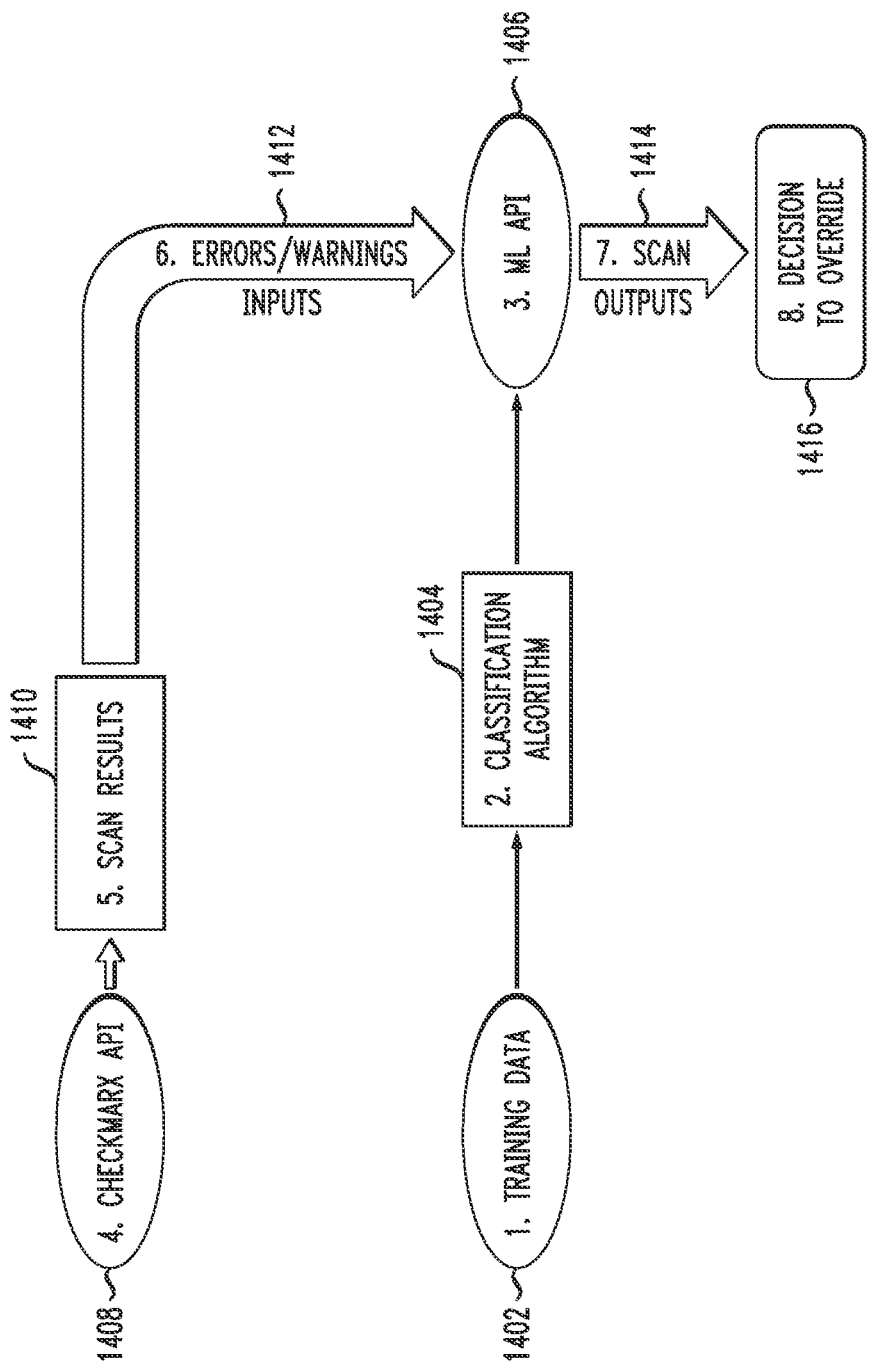
FIG. 14 illustrates a process of static application security test scanning enhanced with machine learning according to an illustrative embodiment.

Turning now to FIG. 14, a process 1400 of SAST scanning enhanced with machine learning, as implemented by software deployment management engine 200, is depicted. Assume a SAST application known as Checkmarx is employed in this non-limiting example. Checkmarx categorizes errors into different categories such I/O errors, XSS errors, un-sanitized input errors, security errors, etc. (see also static code analysis module 214 in FIG. 2). Often, depending on the application architecture, a decision is made by an application architect to ignore certain low and medium severity warnings. For example, for certain microservice calls routed through a secure application programming interface (API) gateway, certain medium severity security errors/warnings may be ignored in SAST reports. Such actions are manually performed by approvers/administrators. However, occurrence of such errors may cause pipelines to fail and stall the deployment process. Thus, software deployment management engine 200 intelligently identifies the warnings/errors which have been flagged as unimportant/ignore based on past behavior and takes appropriate action accordingly.

By utilizing historical data of the kinds of errors flagged as unimportant/improper identification, patterns are identified which enable software deployment management engine 200 to auto-flag new kinds of errors. To do so, a classification algorithm is used to determine the recommended action on a new error.

Process 1400 in FIG. 14 performs these functionalities as will now be further explained. As shown, process 1400 comprises training data 1402, a classification algorithm 1404, an ML API 1406, a Checkmarx API 1408, scan results 1410, error/warning inputs 1412 to ML API 1406, scan outputs 1414 from ML API 1406, and a decision to override 1416.

In order to train the machine learning model used by machine learning engine 220, training data 1402 is obtained in the form of historical data of user actions on different errors for a particular project and account, e.g., from different SAST providers such as Checkmarx. It is assumed that the following fundamental fields are able to take a decision on new errors: account, project, error type, error severity, user action (error override: yes/no). Sample data 1500 from the SAST application is detailed in FIG. 15.

Classification algorithm 1404 utilizes a binary classification algorithm to train the ML model using training data 1402. By way of example only, a decision tree algorithm can be used. For the ML model, account, project, error type, and error severity are assumed to be independent variables. User action (error override: yes/no) is the dependent variable which needs to be predicted in this case. A 70:30 train test split of the sample data gave an accuracy of around 95%.

The results from the new SAST scans are fed into ML API 1406 with the pre trained model in order to determine whether the new error qualifies for override based on past actions. If the ML model predicts override action as true, Checkmarx/SAST Application APIs are called to update the status as such.

Figure 16:
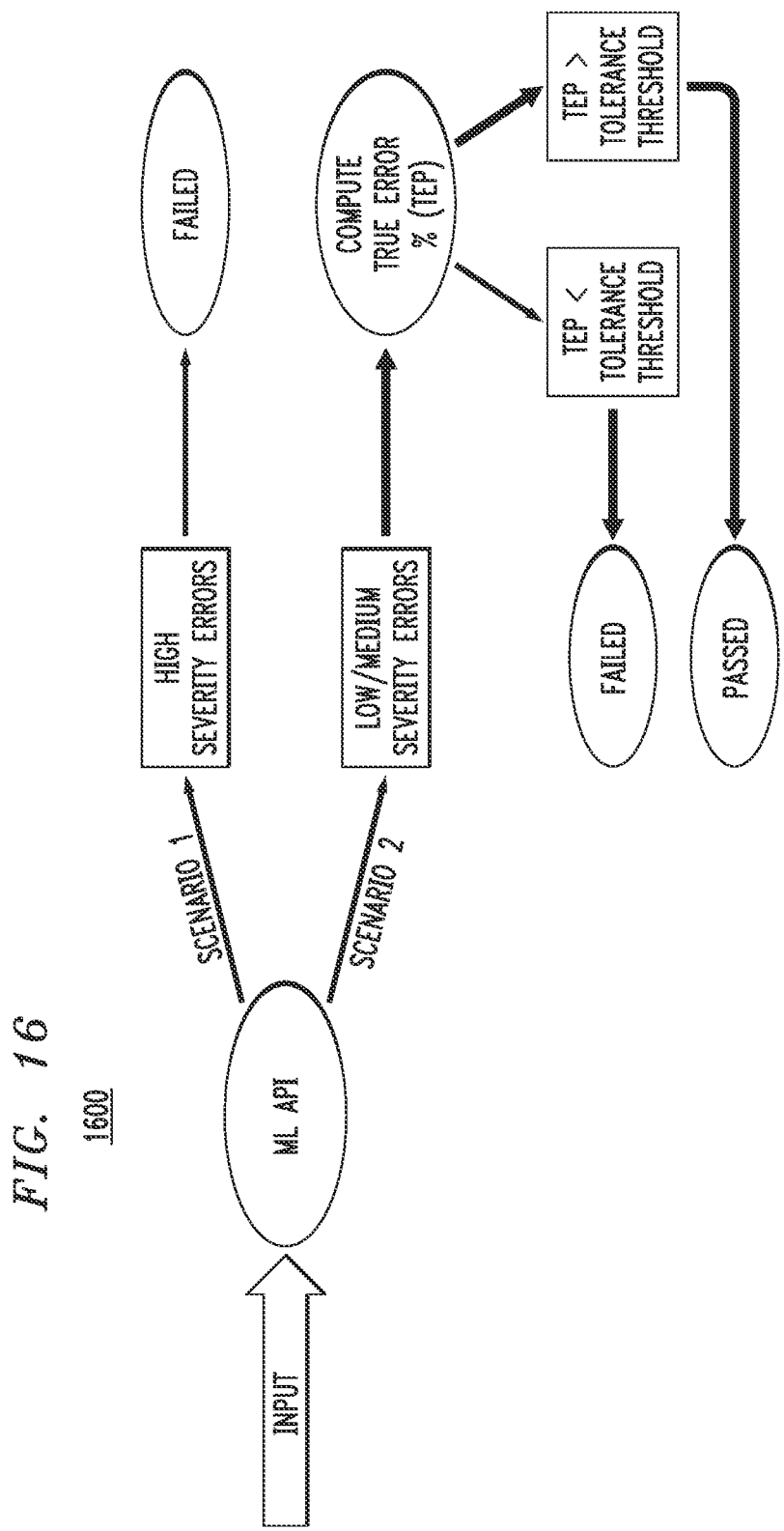
FIG. 16 illustrates an example of a static application security test stage decision to pass or fail a deployment script according to an illustrative embodiment.

Based on the actions of the previous stage, software deployment management engine 200 determines whether to fail the deployment or allow the same, depending on a set threshold. For example, as shown in use FIG. 16, a decision stage 1600 is depicted based on a true error percentage (TEP) and a tolerance threshold. As shown, if there is a high severity error, decision stage 1600 fails the stage. However, if there are no high severity errors, and say of the 10 errors flagged in this stage, the ML model recommends ignoring 8, a true error ratio comes out to be 2/10 i.e., 0.2. If the error threshold is higher (say 0.25), the stage is allowed, else it fails.

On an average, it takes about 2 minutes to deploy each microservice application. Taking a very conservative estimate of even 10 applications per project, the deployment stage alone would take 20 minutes on an average. If a code changes affect only 3 applications, the deployment stage runs for six minutes. That is 14/20 or 70% of the time saved in the deployment stage. Even from use cases which have integrated DI, the observation is that it saves around 2/3 of the deployment time on average. Combined with an intelligent SAST scanning stage, which has the potential to reduce the pipeline times by a further 25-30 minutes, this ensures for a fast and optimized pipeline tailored to user needs.

Many advantages are realized in accordance with software deployment management engine 200. By way of example only, these advantages include but are not limited to: (i) saves significant time both in terms of writing CI/CD scripts tailored to each environment and the mean time taken for the pipelines to run; (ii) eliminates redundancy and deploys only applications which are affected by code changes; (iii) ensures effective utilization of GitLab resources, such as runners and thus improves efficiency overall; (iv) fully configurable with choice to generate deployment scripts as per specifications; (v) solution can be extended to applications in other languages (illustrative implementations described herein were tailored to Spring Boot Projects on App Continuum, but are not limited thereto); (vi) reduces manual effort and time needed to maintain the deployment scripts; and (vii) increases productivity and mean time to ship code.

Accordingly, illustrative embodiments enable a user to simply specify the parameters for the target deployment, type of deployment, and the software deployment management engine intelligently identifies the changed files and dependent applications and generates the deployment script(s) to reduce the deployment time by about 70% average.

Further, illustrative embodiments also intelligently identify new code changes through commit analysis thereby eliminating redundancy by generating deployment scripts for applications only affected by the code change and improving the mean time taken for deployment stages to run.

Illustrative embodiments also automatically generate application deployment scripts referencing the developer preferences, hence ensuring that the user's perspective is given primary focus and ensuring full configurability.

Still further, illustrative embodiments use machine learning and historical user data to identify types of SAST errors based on past precedence and intelligently determine whether to pass/halt deployment thereby reducing manual effort and optimizing results while managing risks associated.

Figure 17:
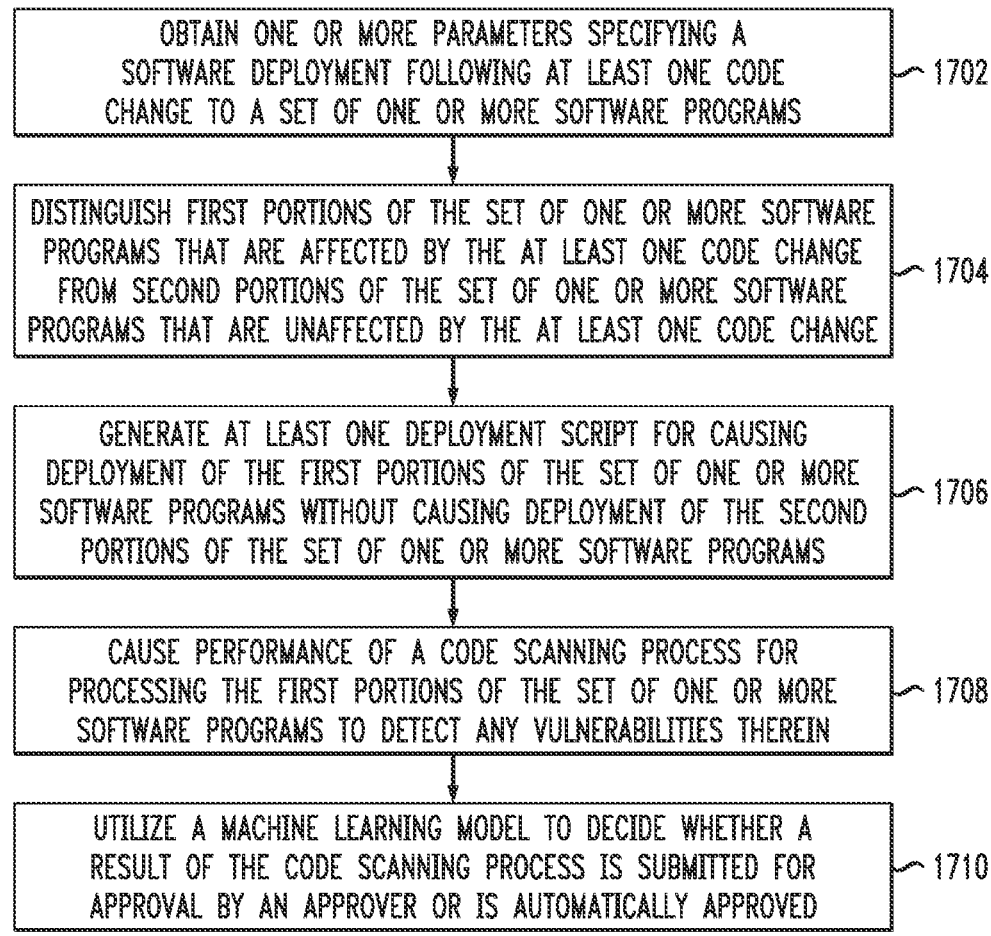
FIG. 17 illustrates a software deployment management methodology according to an illustrative embodiment.

FIG. 17 illustrates a software deployment management methodology 1700 according to an illustrative embodiment. Step 1702 obtains one or more parameters specifying a software deployment following at least one code change to a set of one or more software programs. Step 1704 distinguishes first portions of the set of one or more software programs that are affected by the at least one code change from second portions of the set of one or more software programs that are unaffected by the at least one code change. Step 1706 generates at least one deployment script for causing deployment of the first portions of the set of one or more software programs without causing deployment of the second portions of the set of one or more software programs. Step 1708 causes performance of a code scanning process for processing the first portions of the set of one or more software programs to detect any vulnerabilities therein. Step 1710 utilizes a machine learning model to decide whether a result of the code scanning process is submitted for approval by an approver or is automatically approved.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

Figure 18:
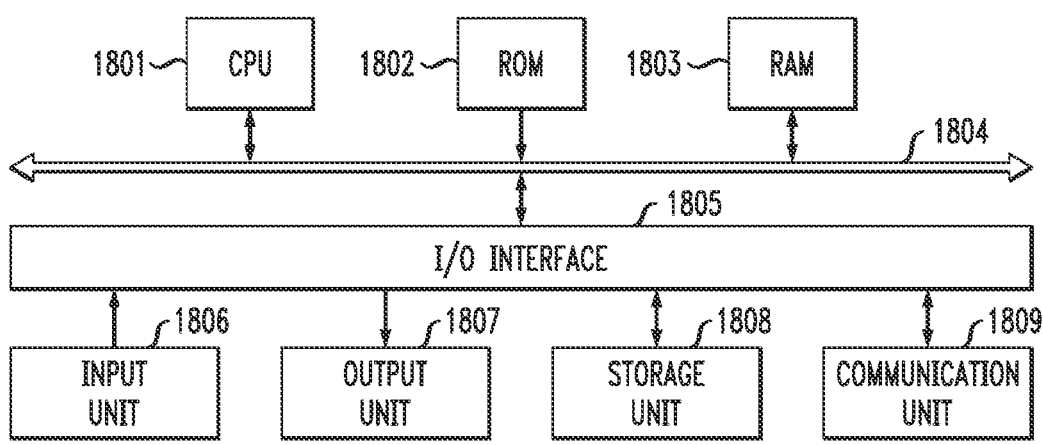
FIG. 18 illustrates an example of a processing platform that may be utilized to implement automated software deployment management functionalities according to an illustrative embodiment.

FIG. 18 illustrates a block diagram of an example processing device or, more generally, an information processing system 1800 that can be used to implement illustrative embodiments. For example, one or more components in FIGS. 1-17 can comprise a processing configuration such as that shown in FIG. 18 to perform steps/operations described herein. Note that while the components of system 1800 are shown in FIG. 18 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 1800 can include multiple processing devices, each of which comprise the components shown in FIG. 18.

As shown, the system 1800 includes a central processing unit (CPU) 1801 which performs various appropriate acts and processing, based on a computer program instruction stored in a read-only memory (ROM) 1802 or a computer program instruction loaded from a storage unit 1808 to a random access memory (RAM) 1803. The RAM 1803 stores therein various programs and data required for operations of the system 1800. The CPU 1801, the ROM 1802 and the RAM 1803 are connected via a bus 1804 with one another. An input/output (I/O) interface 1805 is also connected to the bus 1804.

The following components in the system 1800 are connected to the I/O interface 1805, comprising: an input unit 1806 such as a keyboard, a mouse and the like; an output unit 1807 including various kinds of displays and a loudspeaker, etc.; a storage unit 1808 including a magnetic disk, an optical disk, and etc.; a communication unit 1809 including a network card, a modem, and a wireless communication transceiver, etc. The communication unit 1809 allows the system 1800 to exchange information/data with other devices through a computer network such as the Internet and/or various kinds of telecommunications networks.

Various processes and processing described above may be executed by the CPU 1801. For example, in some embodiments, methodologies described herein may be implemented as a computer software program that is tangibly included in a machine readable medium, e.g., the storage unit 1808. In some embodiments, part or all of the computer programs may be loaded and/or mounted onto the system 1800 via ROM 1802 and/or communication unit 1809. When the computer program is loaded to the RAM 1803 and executed by the CPU 1801, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   at least one processing device comprising a processor coupled to a memory, the at least one processing device, when executing program code, operates as a software deployment management engine configured to:
   obtain one or more developer-defined parameters specifying a software deployment following at least one code change to a set of one or more software programs, the one or more developer-defined parameters specifying, for the set of one or more software programs, a target deployment and a type of deployment;
   distinguish first portions of the set of one or more software programs that are affected by the at least one code change from second portions of the set of one or more software programs that are unaffected by the at least one code change;
   generate one or more configuration files based on the one or more developer-defined parameters;
   determine whether one or more dependency relationships associated with the at least one code change exist by detecting dependencies between the one or more configuration files and the set of one or more software programs based on commit data; and
   generate at least one deployment script for causing deployment of the first portions of the set of one or more software programs without causing deployment of the second portions of the set of one or more software programs based at least in part on the detected dependencies.

2. The apparatus of claim 1, wherein the software deployment management engine is further configured to cause performance of a code scanning process for processing the first portions of the set of one or more software programs to detect any vulnerabilities therein.

3. The apparatus of claim 2, wherein the software deployment management engine is further configured to utilize a machine learning model to decide whether a result of the code scanning process is submitted for approval by an approver or is automatically approved.

4. The apparatus of claim 3, wherein the software deployment management engine is further configured to train the machine learning model based on historical approval data.

5. The apparatus of claim 4, wherein the software deployment management engine is further configured to train the machine learning model based on historical approval data using a binary classification algorithm.

6. The apparatus of claim 5, wherein the software deployment management engine is further configured to utilize the trained machine learning model to pass or fail the at least one deployment script.

7. The apparatus of claim 6, wherein the software deployment management engine is further configured to pass or fail the at least one deployment script based on a severity of any vulnerability detected.

8. The apparatus of claim 7, wherein the software deployment management engine is further configured to pass or fail the at least one deployment script based on an error threshold.

9. The apparatus of claim 1, wherein a current commit is compared to a previous commit to identify which portions of the set of one or more software programs are the first portions and which are the second portions.

10. A method comprising:
    obtaining, via a software deployment management engine, one or more developer-defined parameters specifying a software deployment following at least one code change to a set of one or more software programs, the one or more developer-defined parameters specifying, for the set of one or more software programs, a target deployment and a type of deployment;
    distinguishing, via the software deployment management engine, first portions of the set of one or more software programs that are affected by the at least one code change from second portions of the set of one or more software programs that are unaffected by the at least one code change;
    generating one or more configuration files based on the one or more developer-defined parameters;
    determining whether one or more dependency relationships associated with the at least one code change exist by detecting dependencies between the one or more configuration files and the set of one or more software programs based on commit data; and
    generating, via the software deployment management engine, at least one deployment script for causing deployment of the first portions of the set of one or more software programs without causing deployment of the second portions of the set of one or more software programs based at least in part on the detected dependencies.

11. The method of claim 10, further comprising causing performance of a code scanning process for processing the first portions of the set of one or more software programs to detect any vulnerabilities therein.

12. The method of claim 11, further comprising utilizing a machine learning model to decide whether a result of the code scanning process is submitted for approval by an approver or is automatically approved.

13. The method of claim 12, further comprising training the machine learning model based on historical approval data.

14. The method of claim 13, further comprising training the machine learning model based on historical approval data using a binary classification algorithm.

15. The method of claim 14, further comprising utilizing the trained machine learning model to pass or fail the at least one deployment script.

16. The method of claim 15, further comprising passing or failing the at least one deployment script based on a severity of any vulnerability detected.

17. The method of claim 16, further comprising passing or failing the at least one deployment script based on an error threshold.

18. The method of claim 10, wherein a current commit is compared to a previous commit to identify which portions of the set of one or more software programs are the first portions and which are the second portions.

19. A computer program product comprising a non-transitory processor-readable storage medium having stored therein program code of one or more software programs, wherein the program code when executed by at least one processing device cause the at least one processing device to operate as a software deployment management engine configured to:
obtain one or more developer-defined parameters specifying a software deployment following at least one code change to a set of one or more software programs, the one or more developer-defined parameters specifying, for the set of one or more software programs, a target deployment and a type of deployment;
distinguish first portions of the set of one or more software programs that are affected by the at least one code change from second portions of the set of one or more software programs that are unaffected by the at least one code change;
generate one or more configuration files based on the one or more developer-defined parameters;
determine whether one or more dependency relationships associated with the at least one code change exist by detecting dependencies between the one or more configuration files and the set of one or more software programs based on commit data; and
generate at least one deployment script for causing deployment of the first portions of the set of one or more software programs without causing deployment of the second portions of the set of one or more software programs based at least in part on the detected dependencies.

20. The computer program product of claim 19, wherein a current commit is compared to a previous commit to identify which portions of the set of one or more software programs are the first portions and which are the second portions.

* * * * *